March 24, 1931.                C. H. BISSELL                1,797,972
                              MAGNETIC CLUTCH
                             Filed May 3, 1928
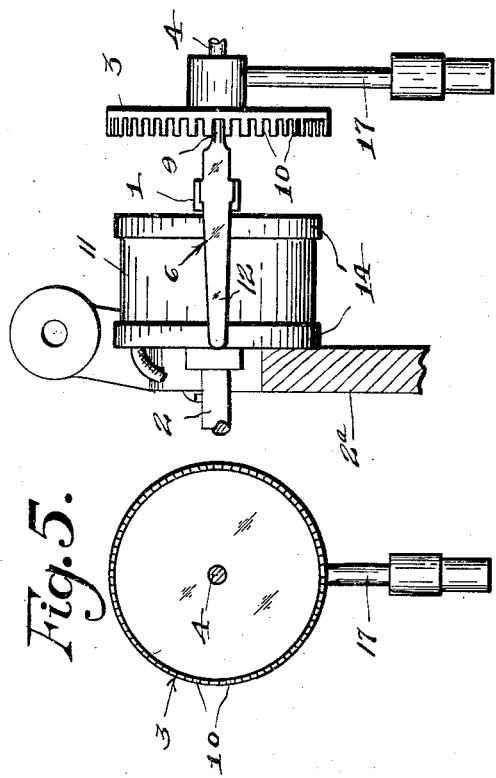
INVENTOR.
Carl H. Bissell
BY
Parsons & Bodell
ATTORNEYS.

Patented Mar. 24, 1931

1,797,972

UNITED STATES PATENT OFFICE

CARL H. BISSELL, OF SYRACUSE, NEW YORK, ASSIGNOR TO CROUSE-HINDS COMPANY, OF SYRACUSE, NEW YORK, A CORPORATION OF NEW YORK

MAGNETIC CLUTCH

Application filed May 3, 1928. Serial No. 274,744.

This invention has for its object a magnetic clutch which is particularly simple, economical and compact in construction and highly efficient in use.

The invention consists in the novel features and constructions and combinations hereinafter set forth and claimed.

In describing this invention, reference is had to the accompanying drawings in which like characters designate corresponding parts in all the views.

Figure 1 is a side elevation of this magnetic clutch.

Figures 2 and 3 are opposite face views of the driving and driven members and the parts associated therewith.

Figure 4 is an elevation, partly in section, of the driving member and the electro-magnet.

Figure 5 is a diagrammatic view of the driving member and the electro-magnet.

This magnetic clutch comprises alined driving and driven members, one of said members having an element shiftable into and out of engagement with the other member and being normally out of clutching engagement therewith, an electro-magnet arranged concentric with the axis of said members, said element having an armature arranged in the field of the core of the magnet to be operated thereby when the magnet is energized and shift said element into clutching engagement.

1 designates the driving member which is mounted upon a shaft 2 supported in any suitable manner, the shaft being connected to an actuating mechanism as an electric motor not shown. It is journalled in a bearing in any suitable support. It is here shown as journalled in a bearing formed in the core of the electro-magnet which is carried by a frame or bracket 2ᵃ. Insofar as this invention is concerned, the shaft is merely a drive shaft.

3 is the driven member mounted upon the driven shaft 4. The driven shaft is supported in any suitable manner and is here illustrated as having a cone bearing 5 in the end of the shaft 2.

One of the members, here shown as the driving member, comprises an element movable into and out of engagement with the other or driven member 3 and normally out of engagement therewith, this element having an armature arranged in the field of the magnet in order to be operated when the magnet is energized to shift said element into clutching engagement with the driven member 3.

6 designates the clutch element which is here shown as in the form of a lever pivoted at 7 to an arm 8 extending radially from the driving member 1, the pivot extending crosswise of the axis of the driving member and the lever extending in a direction lengthwise of the axis of the driving member so that the lever is movable radially on its pivot relatively to the axis of the member 1. One arm of the lever is provided with means for engaging the driven member 3 and as here illustrated, one arm of the lever is formed with a tooth 9 for engaging any of a number of teeth 10 on the face of the driven member 3 opposed to the driving member.

11 is the electro-magnet, the core of which has a cylindrical head arranged concentric with the axis of the driving member 1 and the armature arm 12 of the lever 6 being arranged in the field of the core of the magnet.

As here illustrated, the coils 13 of the magnet are wound about the core which is concentric with the axis of the driving member 1 and the core has cylindrical heads 14 at opposite ends of the coils and extending to or beyond the periphery thereof, and the armature arm 12 overlies the edges of the heads 14 and is spaced apart therefrom.

When the coils of the magnet are energized by throwing a suitable switch in the electric feed circuit, the armature arm 12 of the lever 6 is moved radially inwardly moving the tooth 9 of the lever 6 into interlocking engagement with the teeth 10 of the driven member 3 so that as the driving shaft rotates, the driven member 3 rotates therewith as long as the magnet is energized.

During the rotation of the driving member, the armature arm 12 moves planetarily around the cylindrical edges of the heads 14, as the magnet remains stationary.

When the current to the magnet is discontinued, the lever 6 is returned to its normal position by a returning spring 15.

As seen in Figure 4, a sleeve 16 is located within the hub of the core of the magnet and the shaft 2 extends through the sleeve, this sleeve being of brass or some other non-magnetic material. The magnet is held from rotative movement in any suitable manner as by the support or bracket $2^a$.

The driven member 3 is shown as provided with a weighted arm 17.

One use of this magnetic clutch is described in my pending application for an automatic emergency selective switch Serial Number 285,029 filed June 13, 1928, where the arm 17 serves to trip a switch, which, when closed, closes the circuit to the magnet and to the electric motor actuating the driving clutch element.

What I claim is:

1. A magnetic clutch comprising alined driving and driven members, one of said members having a lever extending lengthwise of the axis of said members and pivoted between its ends, one arm thereof movable into and out of clutching engagement and being normally out of clutching engagement, the other arm serving as an armature, an electro-magnet arranged concentric with the axis of said members and having its core arranged to attract said armature to move the same when the magnet is energized.

2. A magnetic clutch comprising alined driving and driven members, one of said members having a lever extending lengthwise of the axis of the members and pivoted between its ends, one arm thereof movable into and out of clutching engagement and being normally out of clutching engagement, the other arm serving as an armature, an electro-magnet arranged concentric with the axis of said members and having its core arranged relatively to said armature to move the same when the magnet is energized, the magnet having its windings arranged concentric with the axis of the said members and having its core provided with a cylindrical portion at the periphery of the coil and in the field of which the armature is arranged.

3. A magnetic clutch comprising alined driving and driven members, one of said members having a lever extending lengthwise of the axis of said members and pivoted between its ends, one arm thereof movable into and out of clutching engagement, and being normally out of clutching engagement, the other arm serving as an armature, an electro-magnet arranged concentric with the axis of said members and having its core arranged in juxtaposition to said armature to move the same when the magnet is energized, the magnet having its windings arranged concentric with the axis of the driving member and having its core provided with a cylindrical peripheral portion around which the armature moves, the magnet being fixed from rotation whereby the armature moves along the periphery of the core during the rotation of the driving member.

4. A magnetic clutch comprising alined driving and driven members, one of said members having a lever pivoted thereto and extending lengthwise of and spaced apart from the axis of the members, one arm of the lever being normally out of clutching engagement, the other arm serving as an armature, an electro-magnet having a core arranged concentric with the axis of said members, the armature being arranged to be moved toward and from the periphery of the core when the magnet is energized and de-energized.

In testimony whereof, I have hereunto signed my name, at Syracuse, in the county of Onondaga, and State of New York, this 28th day of March, 1928.

CARL H. BISSELL.